June 2, 1942.　　　C. T. NEMIR　　　2,284,879
CASHEW NUT SHELLING DEVICE
Filed June 9, 1939　　　3 Sheets-Sheet 1
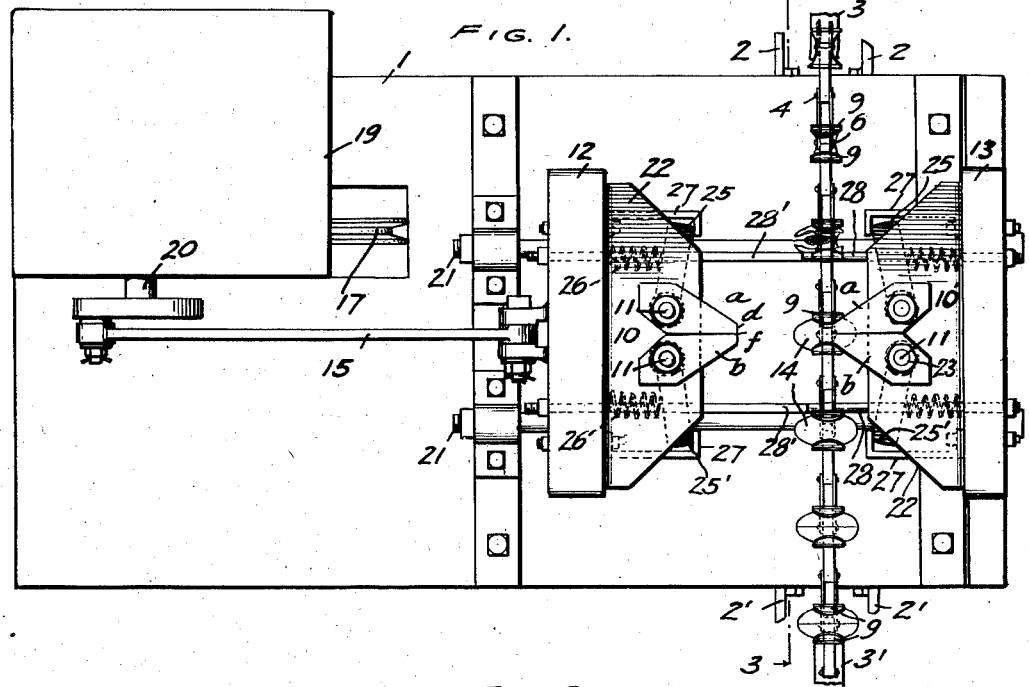
INVENTOR
CLARENCE T. NEMIR
BY Jos. A. O'Connell
ATTORNEY

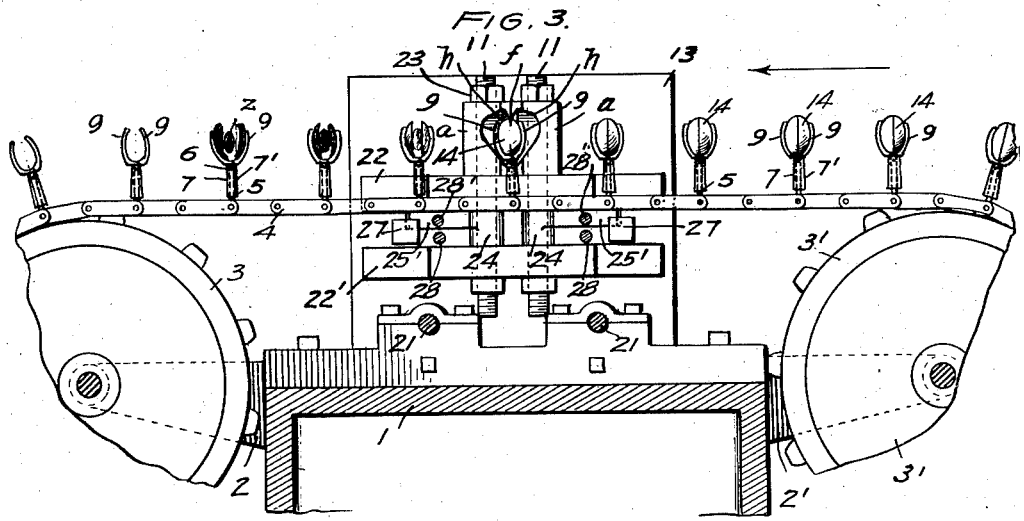
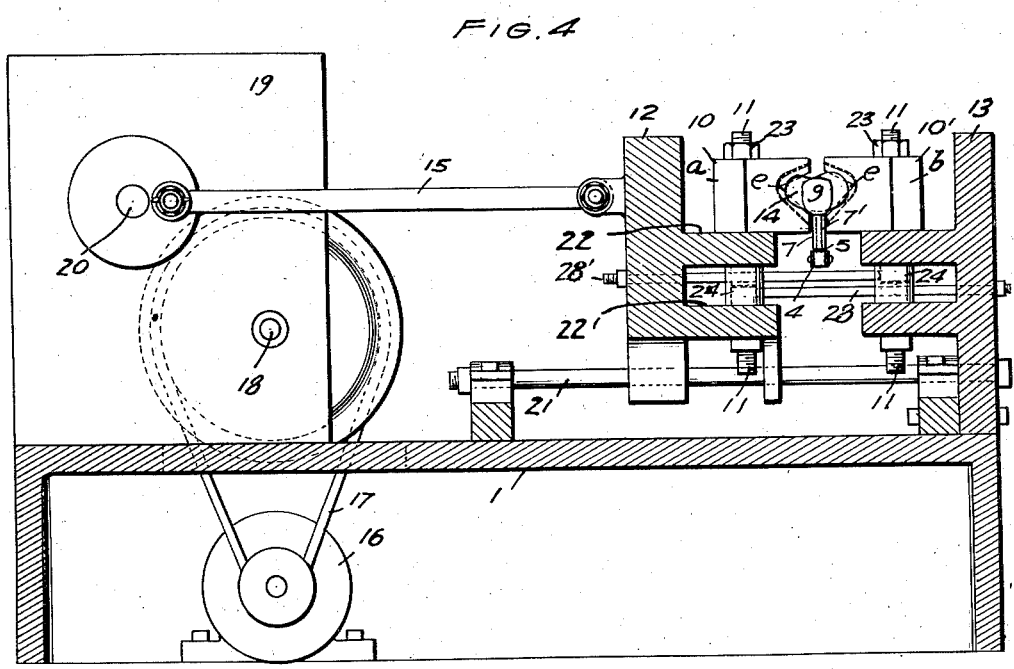

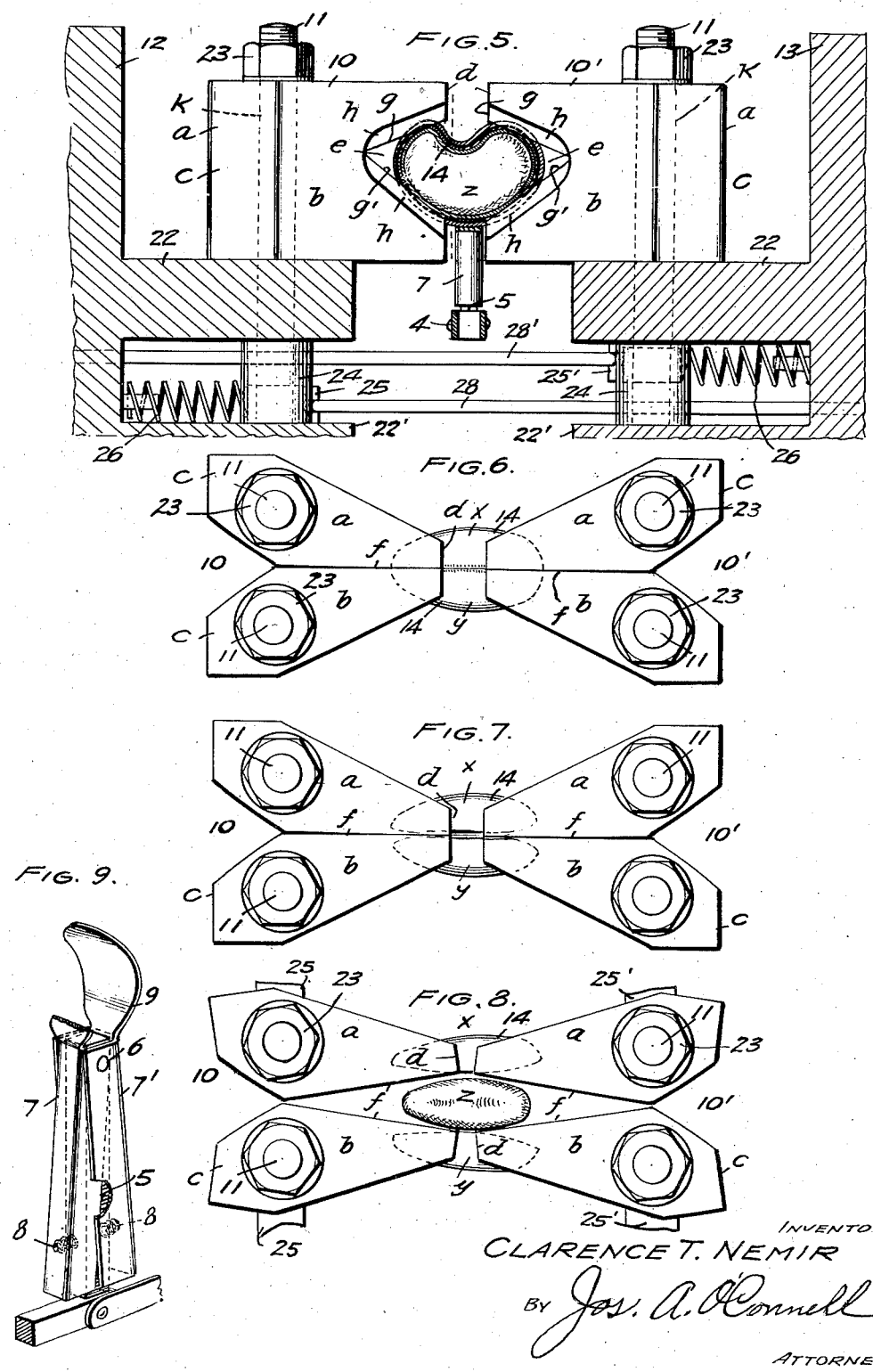

Patented June 2, 1942

2,284,879

UNITED STATES PATENT OFFICE 2,284,879

CASHEW NUT SHELLING DEVICE

Clarence T. Nemir, Austin, Tex.

Application June 9, 1939, Serial No. 278,355

3 Claims. (Cl. 146—10)

This invention relates generally to nut-shelling machines and more specifically to a method and apparatus for shelling cashew nuts.

As is well known, the cashew nut contains a juice or oil confined in the honey-combed structure of the shell. This oil is injurious to the pigment of the human skin, contact therewith often resulting in skin discoloration or an itching and rash. In shelling the nut to extract the kernel it is the practice generally to subject the nut, prior to the shelling operation, to a heating process for boiling out or evaporating the juice and, then, to employ native labor and crude primitive methods to crack the shells and free the kernels. Even with this system, it has been found that some active juice adheres to the shell and causes discomfort to one coming in contact therewith.

The above described method of shelling cashew nuts is far from being satisfactory from a commercial standpoint because it is necessarily slow and tedious; the output is small; the source of labor is restricted to natives of tropical countries; and most important, the juice, which because of its high iodent content is commercially valuable, is now wasted in order to extract the kernel of the nut.

An object of the present invention is to provide a novel method for extracting the kernel of the cashew nut without requiring previous heat treatment of the shell or otherwise destroying the valuable juice whereby the latter is preserved in the shell so that it later may be extracted and disposed of for its commercial value.

Another object of the invention is to provide novel mechanical means for automatically shelling cashew nuts in a quick and expeditious manner to increase production while at the same time reducing to a material degree the possibility of the sheller coming in contact with the injurious oil or juice of the shell.

Other objects and advantages of the invention will be apparent from the construction and operation of the device described herein and illustrated in the accompanying drawings, wherein—

Figure 1 is a top plan view, showing the shelling knives in open position.

Figure 2 is a similar view showing the shelling knives in closed position.

Figure 3 is a vertical cross sectional view on line 3—3 of Figure 1.

Figure 4 is a vertical longitudinal sectional view on line 4—4 of Figure 2.

Figure 5 is a detail view, on an enlarged scale and partly in elevation and partly in section, of the shelling end of the device.

Figures 6, 7 and 8 are detail views, in top plan, of the shelling knives in various phases of operations, and Figure 9 is a detail view, in perspective of one of the nut carriers.

Previous known methods of shelling nuts to extract the edible kernels generally involve a cracking or splintering of the shell into fragments. The present method, however, is directed to the removal of the shell in two parts or halves for the better preservation, in shelling cashew nuts, of the juice with which the shell thereof is honey-combed. In carrying out the method, two incisions are made at relatively opposite places at each end of the nut and substantially in the same plane; then by a prying action at the lines of incision the shell is split from end to end into halves. The two halves are then pulled or spread apart to free the kernel. The successive steps of cutting, prying or splitting, and separating the shell sections from the kernel can be carried out by hand tools or any suitable apparatus. The machine hereinafter described is one embodiment of an apparatus designed to carry out the step of the method. An advantage of this method is that it provides for shelling the cashew nut in its most regular position; that is, the three principles of cutting, prying, and splitting are applicable to the two ends of the nut. The sides of the nut are very irregular and not applicable to motorized precision.

In the apparatus herein disclosed for practicing this method, the various mechanical units are mounted on a suitable base 1 which may be of the type and construction illustrated. Bearing brackets 2 and 2' on the sides of the base near one end thereof support sprockets 3 and 3' over which is trained a chain 4. At spaced points along the chain are fixedly mounted short upright posts 5 on which are pivoted at 6 the channel levers 7 and 7' adapted to fit one within the other but normally held apart by springs 8 arranged as shown between the members and the post. Each member has an integrally formed jaw 9 at one end. These jaws are adapted to grip the sides of a cashew nut placed therebetween and accordingly are shaped as shown in the drawings to substantially conform to and firmly grip the nut; being urged, one toward the other, by the thrust of springs 8. The spring-tensioned jaw members 7—7' serve as convenient spring clips for holding the cashew nut and are easily opened to receive or to release the nuts by moving the lower ends of the member together against the resistance of the springs 8. This may be done manually by the fingers or by mechanical means. The chain is arranged to pass between the shelling knives of the device with the kidney shaped cashew nuts so positioned in the holding clips or carriers as to present their ends to the cutting edges of the knife blades, as shown in Figure 5.

Two shelling knives 10, 10' are employed and since they are similar, a description of one will suffice. The shelling knife consists of two half sections or blade elements a and b. Each blade element tapers, in plan, from a thick butt or rear end c to a narrow blunt nose or forward end d. In side elevation, the blade element is rectangular and one end thereof is bifurcated to provide a V-shaped notch e opening through opposite sides of the blades but of less dimension adjacent the tapered side f to provide upper and lower cutting edges g and g' converging at their inner extremities. The inner side or face of each cutting edge is in the plane of the side surface f while the outer side is beveled as shown as h. The blade elements of the respective shelling knives are positioned laterally adjacent one another so that when closed, they contact along the faces f so that the corresponding cutting edges g and g' appear, respectively, as a single double-beveled edge. Near the butt end of the blade is a bore k to receive a vertical spindle or shaft 11 to which the blade is keyed or otherwise fixed and with which it turns.

The shelling knife 10 is mounted on a carrier 12 which slides on the base of the device inwardly of the conveyer chain 4 while the carrier 13 for the shelling knife 10' is fixed to the base on the opposite side of the chain. As the nut that is to be shelled comes into position between the shelling knives, as illustrated in Figure 1, the movable knife 10 is moved forward, in a horizontal plane toward the stationary knife 10' to imprison the nut 14 between the knives. Continued movement of the movable knife in the same direction results in the freeing of the edible kernel of the nut by the successive phases of cutting, prying, and splitting the shell. The initial or cutting operation is illustrated in Figure 6. As the knives close in upon the nut, the cutting edges g and g' penetrate the shell, making incisions of not more than $\frac{1}{16}$ of an inch. From hereon, the beveled sides or guards of the cutting edges function as a wedge for prying the two sides of the shell apart, so that continued forward movement of the movable shelling knife causes the shell to be split from end to end. This phase is represented in Figure 7. The final phase of completing the splitting of the shell and prying the split shells apart from the kernel is shown in Figure 8. This is done after the cutting edges have penetrated through the shell of the nut to the kernel and results from a lateral movement imparted to the blade elements of the knives so as to cause them to open or swing outwardly of one another, as hereinafter further explained.

The movable knife carrier or slide 12 is reciprocated by suitable means, which in the present case is shown as comprising an eccentric or pitman mechanism 15 operated from an electric motor 16 through a belt drive connection 17 with a shaft 18 of a gear reduction unit (not shown) enclosed in gear housing 19 and geared to the eccentric or pitman shaft 20. Carrier 12 is guided in its movements by guide rods 21 mounted on the base as shown and on which the carrier is suitably supported. Each carrier is provided on its inner face with a pair of vertically spaced horizontal plate-like projections 22—22', apertured to accommodate the shafts 11 of the shelling knives; the blades being confined on the shafts between the upper surfaces of the projections and the nuts 23 on the upper ends of the shafts. Extending from between the projections and fixed to the shafts by their hubs 24 are crank arms 25—25', springs 26, anchored to the carriers 12 and 13 and pressing against the crank arms, tend to hold the blade elements of the shelling knives closed, as shown in Figure 1. Stops 27 limit the outward movement of the crank arms. In order to impart the lateral movement to the blade elements necessary to the splitting and opening operation previously described with reference to the showing of Figure 8, striker rods 28, 28' are mounted on the carriers 12 and 13 for abutment with the crank arms 25, 25' whereby when the forward travel of the slidable carrier is continued beyond the position shown in Figure 8, the crank arms are turned from the position shown in Figure 1 to the position shown in Figure 2; the resultant opening of the shelling knives causing the two sections x and y of the shell to be pulled apart and clear of the kernel z as depicted in Figure 8. Striker rods 28' are fixed to the carrier 12 and coact with crank arms 25' of the shelling knives 10', while striker rods 28 are fixed to the carrier 13 and coact with the crank arms 25 of the shelling knife 10. One set of crank arms and the corresponding striker rods are vertically offset with respect to the other set of crank arms and striker rods to avoid interference.

In the operation of the device, the unshelled nuts are fed, one at a time, to the relatively reciprocating knives by the movement of the conveyer chain and nut-holding clips, and, after the cutting, prying, and splitting apart of the shell is accomplished, they are withdrawn from between the knives for the subsequent separation of the kernel and the shell section which can be accomplished by a brushing action or by any other desired means. Manually handling of the juice bearing shell is practically eliminated by this apparatus particularly after the shell is split apart. The device may be constructed on a large scale with multiple shelling units or it may be of a smaller, portable type such as is herein disclosed.

Having thus described the invention, I claim:

1. A device for shelling nuts comprising a fixed and a movable member, a pair of spaced parallel and rotatable shafts on each member, a blade element fixed on each shaft and having a cutting edge beveled on one side, a crank arm on each shaft, means normally positioning the shafts and blade elements so that paired elements of the respective members are in lateral contact along the flat sides of their respective cutting edges, striker rods carried by each member and adapted to contact the crank arms of the shafts on the other member at a predetermined movement of the movable member toward the fixed member for turning the shaft to swing apart the said blade elements, and means for moving the movable member toward and away from the fixed member.

2. A device for shelling nuts comprising means for holding the nut to be shelled, a pair of cutters simultaneously movable against the nut from relatively opposite points, said cutters respectively being in two parts capable of being moved laterally apart for effecting corresponding movement of the severed halves of the shell, and means carried by one cutter and co-acting with means carried by the other cutter after a predetermined movement of the said cutters, for so moving the parts of the cutters and limiting further penetration of the cutters into the shell.

3. A device for shelling cashew nuts comprising oppositely disposed sets of cutters having relative sliding movement toward and away from each other, each of said sets comprising two laterally disposed blade elements pivotally mounted for lateral movement toward and away from each other and having complementary cutting edges, said blade elements respectively being beveled on their corresponding outer sides to provide prying elements adjacent the cutting edges but straight on their corresponding inner sides, yieldable means normally holding the complementary blade elements together to provide a single cutting edge and wedge, means for holding a cashew nut between the sets of cutters with its ends presented to the cutting edges of the cutters, means for moving the said sets of cutters against the nut to cut into the shell thereof and pry the same apart, and means carried by the blade elements of the said cutters and mutually co-acting after a predetermined penetration of the shell for moving the said blade elements apart to effect corresponding movement of the severed shell portions to thereby free the kernel.

CLARENCE T. NEMIR.